United States Patent [19]
Uffel

[11] Patent Number: 5,331,428
[45] Date of Patent: Jul. 19, 1994

[54] AUTOMATIC OFFSET AND GAIN CONTROL IN A DOCUMENT SCANNER

[75] Inventor: Bruno V. Uffel, St. Katelijne-Waver, Belgium

[73] Assignee: AGFA-Gevaert N. V., Mortsel, Belgium

[21] Appl. No.: 42,766

[22] Filed: Apr. 6, 1993

[30] Foreign Application Priority Data

May 11, 1992 [EP] European Pat. Off. ........ 92201227.3

[51] Int. Cl.⁵ ............................................. H04N 1/40
[52] U.S. Cl. .................................. 358/446; 358/443; 358/461
[58] Field of Search ............... 358/446, 443, 464, 461, 358/447

[56] References Cited

U.S. PATENT DOCUMENTS 4,216,503  8/1980  Wiggins .................. 358/446
5,115,327  5/1992  Ishima .................... 358/446

Primary Examiner—Edward L. Coles, Sr.
Assistant Examiner—Madeleine Anh-Vihn Nguyen

[57] ABSTRACT

An automatic offset and gain control method for use in an electronic high quality scanning apparatus, operating on the source signal values outputted preferably in digitized form when the scanning apparatus scans a given source document and which represent on a pixel-related basis the density values of such source segment, produces corrected signal values representative of the full range of black and white or colors of the original. In the control method, first, a minimum density value relative to the source document is determined. Then, a high density value and a low density value are identified by reference to calibrated high and low density values and from these three values the control unit calculates and stores in a memory corrections for offset and gain. These corrections are applied to the source values to continuously correct the same and thus reproduce a corrected version of the source document.

5 Claims, 5 Drawing Sheets

AUTOMATIC OFFSET AND GAIN CONTROL IN A DOCUMENT SCANNER

FIELD OF THE INVENTION

The present invention relates to the field of electro-optical scanning and provides a method for correcting, on an individual pixel basis, all unwanted offset and/or gain variations in the input signal representing the shade of darkness or lightness of the source document.

BACKGROUND OF THE INVENTION

In an opto-electronic input-scanner apparatus a source document is scanned line by line by a narrowly focused light beam. The light reflected from the scanned document is collected by a suitable photosensor to produce a corresponding video signal whose voltage is representative of the shade of darkness or lightness of the document, hereinafter called "source signal".

However, the actual offset and amplitude of the source signal is subject to variations in accordance with such factors as variations in the intensity of the illuminating light beam, drift of the photosensors due to aging or temperature change, drift in the electronic circuits, and many other factors.

Failure to correct possible offsets and amplitude variations of the source signal results in reduction of accuracy of reproduction of both background and contrast in the recorded image.

In the prior art, a calibration scan is executed, in which the unit acquires black and white samples of the source signal produced by the photosensors in response to the illumination of a black-white scanning calibration strip by the scanning beam.

Black and white are designated by the reflectance signal obtained from a "calibration strip", also called "target", and located mostly adjacent to the image scanning area. It may be remarked that in the case of a feed-through scanner, a calibration strip may be as well throughput in the form of a calibration sheet, or it may be temporarily turned in the optical scanning path of the apparatus (as e.g. published by Hanna and Melamud, in IBM Technical Disclosure Bulletin, vol. 21. no. 4, september 1978, p. 1410).

The first half of the strip may be imprinted black, or may be absent but replaced by a control signal which turns the lighting beam off e.g. by closing the lens aperture. The second half of the strip may be imprinted white or be apertured with a clear open gate to expose a nominally white background area of the document; or a so-called "Dmin" filter, which is a filter having a density corresponding to a calibrated white reference density, may be introduced in the optical path of the scan-apparatus.

One specific solution to the above-mentioned problem regarding the signal fluctuations, is described in U.S. Pat. No. 3,952,144 and makes preliminary calibrating scans in which sequentially a known black area and a known white area are scanned, and during which a so-called "automatic background and contrast control unit" in the transmitter stores a sample of the uncorrected video input signal at a time when the known black area is being scanned, and also stores a second sample of the uncorrected video input signal at a time when the known white area is being scanned. Thereafter, during the subsequent scanning of the source document the control unit produces voltages representing the stored black and white samples and combines these voltages to correct the video input signal received during the scanning of the source document.

However, when the real density extremes are outside the range physically incorporated by the calibration strip, said correction method does not guarantee accurate and reliable reproduction of all shades of grey that are available in the source original.

SUMMARY OF THE INVENTION

It is therefore an object of the present invention to provide a method for an automatic offset and gain control, in order to reproduce accurately and reliably all shades of grey or colour that may be present in a source original, even if one density extreme extends beyond the densities of the calibration strip.

It is another object of the invention to improve scans of documents in which the image and the background do not contrast sharply.

Further objects and advantages will become apparent from the description given hereinbelow.

We now have found that the above objects can be achieved by providing a method for processing a variable data-signal representative of the density of a source document, that has been scanned by a lightbeam and the reflected or transmitted light of which has been collected by at least one sensor element, said method comprising the following pixel-related steps:

a) defining a minimum value $V_{min}$, representative of the lowest possible density value which could possibly occur in the source document to be scanned;

b) reading from a calibration reference having a high and a low level of density a sample $V_{b1}$ of the data-signal when said reference density-value is at its high level and storing this value as an offset-value in a "calibration memory"

$$\text{offset} = V_{b1}$$

c) reading from the calibration reference a second sample $V_w$ of said data-signal when said reference density-value is at its low level;

d) dividing $(V_{min} - V_{b1})$ by $(V_w - V_{b1})$ and permanently storing the quotient as a gainfactor G in said calibration memory $$G = \frac{V_{min} - V_{b1}}{V_w - V_{b1}}$$

e) reading the signal values $V_{in}$ by scanning the source document, immediately correcting the signal values $V_{in}$ by first, immediately compensating for offset by calculating the signal difference $V_{dif}$ between $V_{in}$ and $V_{b1}$ ($V_{dif} = V_{in} - V_{b1}$) and second, continually adjusting the offset-corrected input values for gain by multiplying the same by the precalculated gainfactor G, available from the calibration memory according to either of the equations or $V_{corr} = V_{dif} G$.

$$V_{corr} = (V_{in} - V_{b1}) \cdot G$$

In this way, the apparatus will process the variable input signals $V_{in}$ as exact representatives $V_{corr}$ of the reflective gradations in shades of grey in the original. Even, if the lowest density-value of the source signal eventually could reach extremely low values, e.g. below the low calibration level as $V_{min} \leq V_{in} < V_w$.

DETAILED DESCRIPTION OF THE INVENTION

Figure 1:
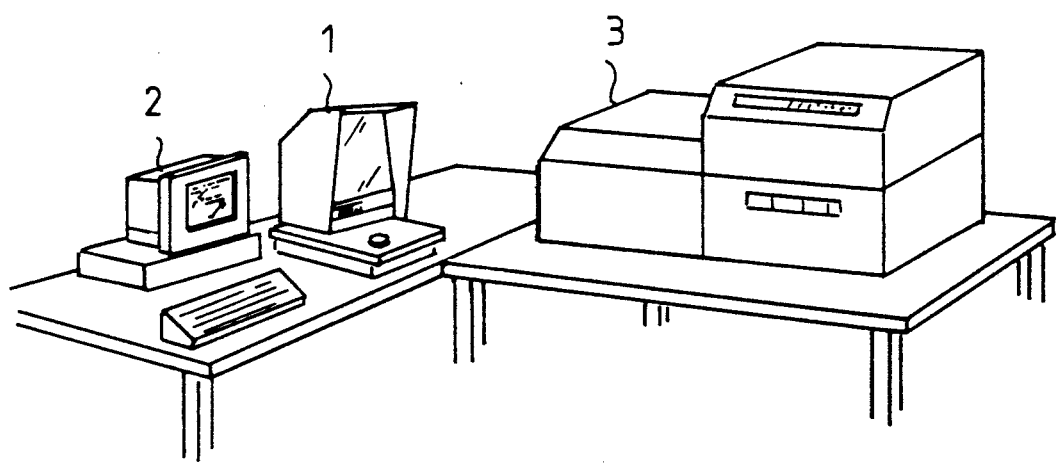
Figure 2:
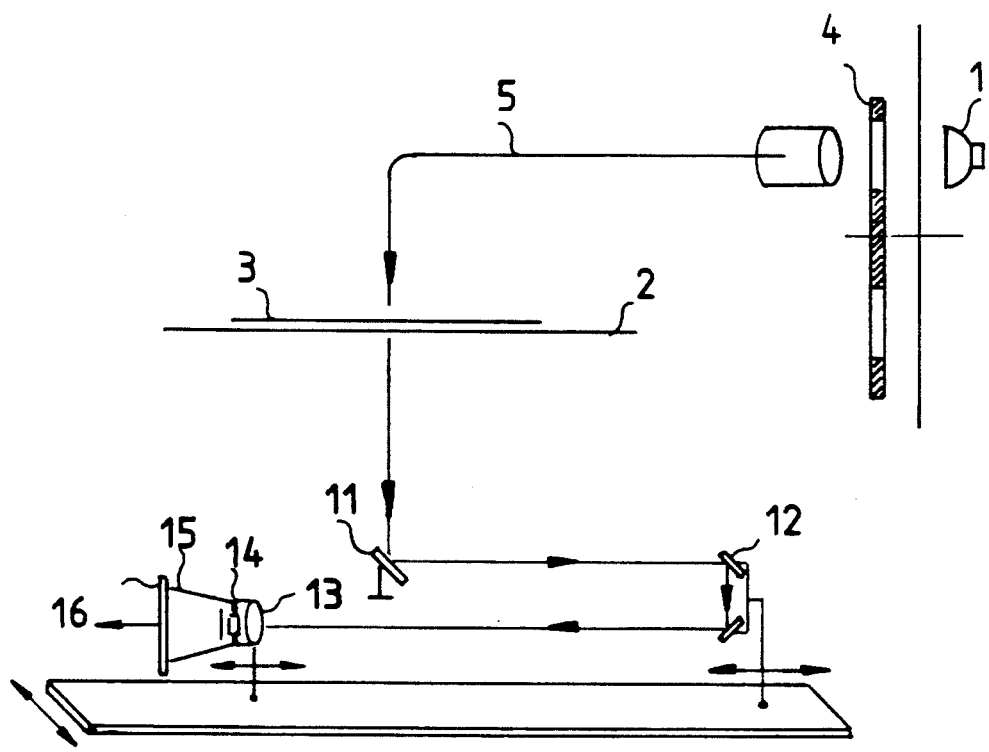
Figure 3:
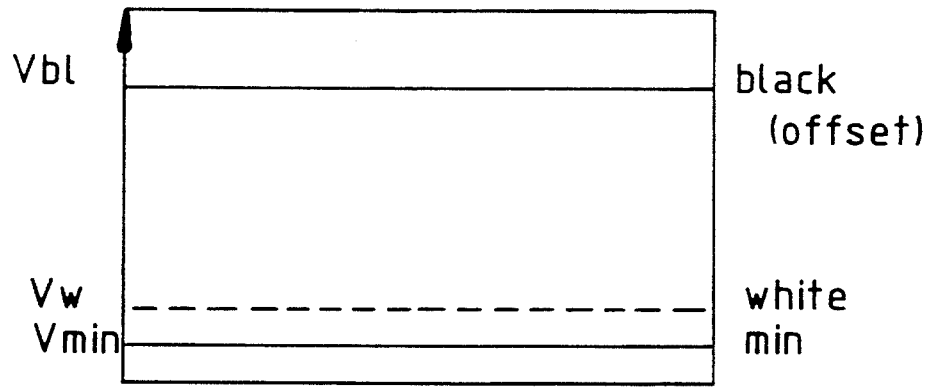
Figure 4:
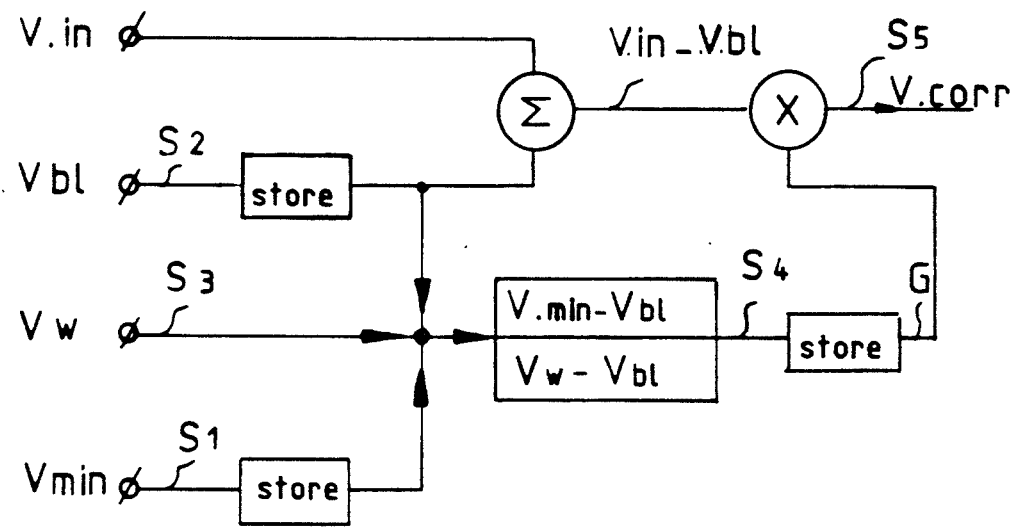
Figure 5:
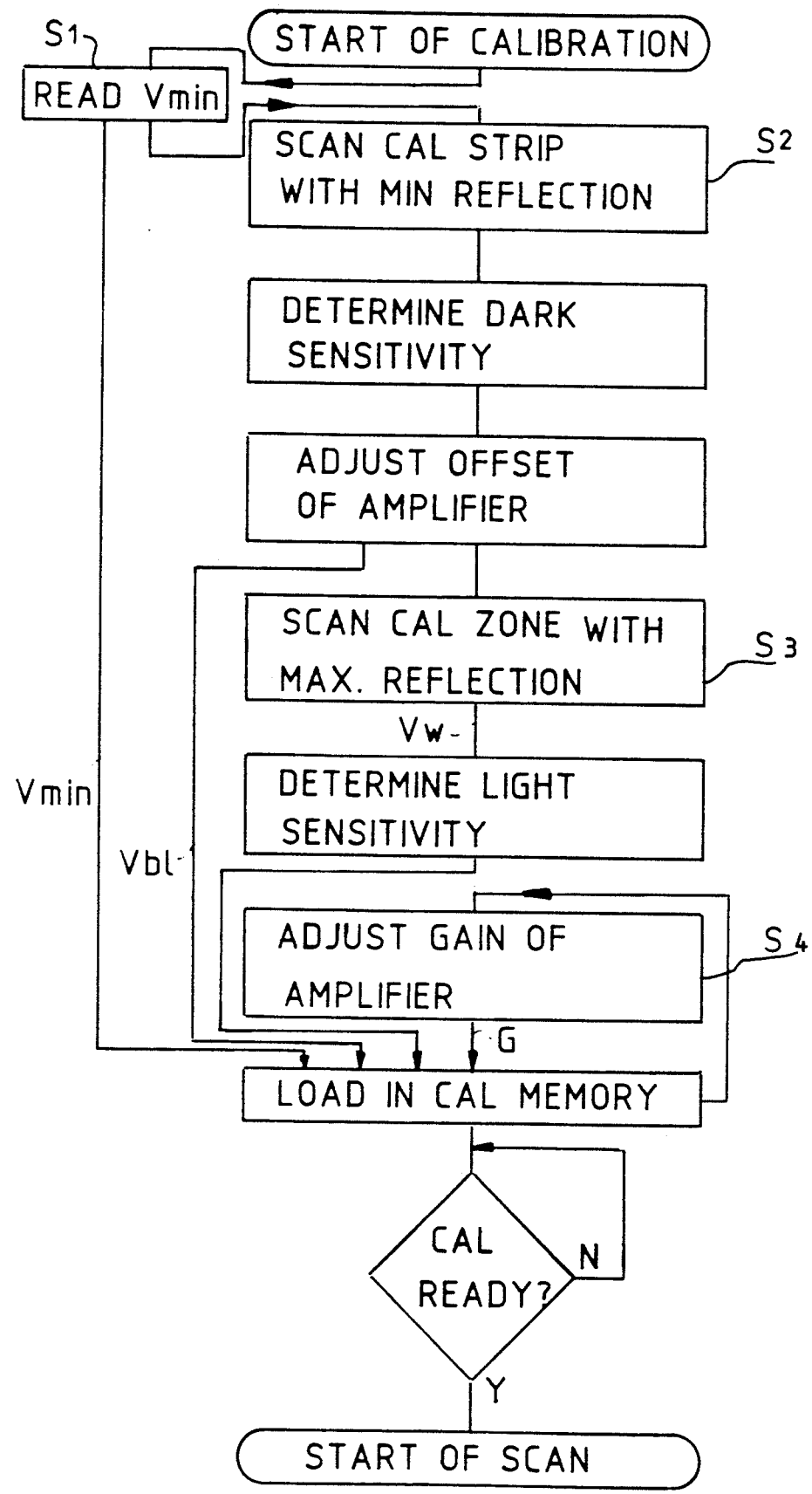
Figure 6:
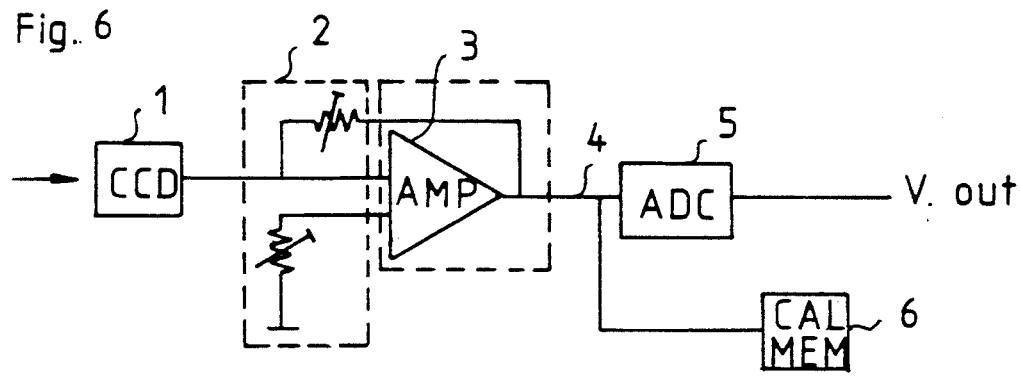
Figure 7:
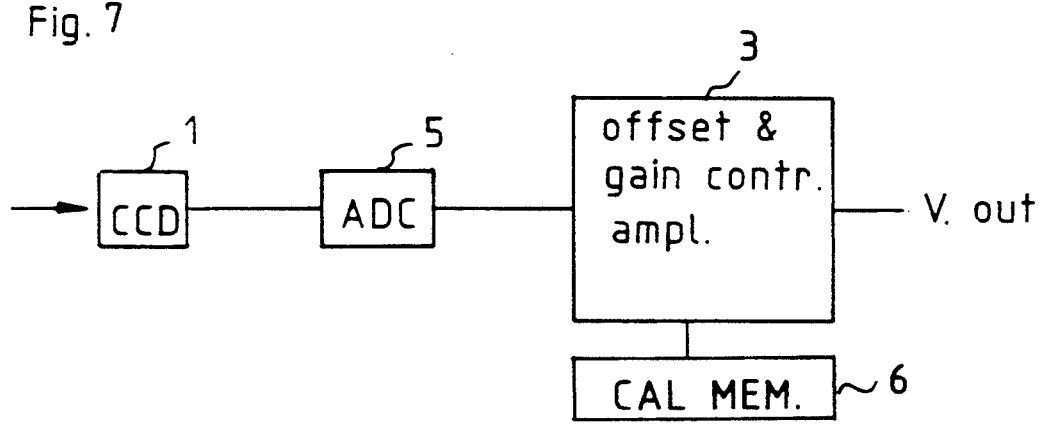

Particular aspects of the present invention and preferred embodiments will be explained hereinbelow with reference to the drawings, in which FIG. 1 is a global overview of a scanner system, FIG. 2 is a functional sketch of a colour scanner, FIG. 3 is a principal diagram of the calibration and source signal levels FIG. 4 is a principal block diagram of the calibration, FIG. 5 is a principal flow chart of the present calibration, FIG. 6 is a preferred embodiment of the present invention, FIG. 7 is an alternative embodiment of the present invent.

FIG. 1 generally shows a system in which the method of the invention can be applied. The scanning and digitising apparatus of FIG. 1 comprises as main subparts: a viewer or workstation 1, a microprocessor 2, a scanner 3 and possibly a printer or a recorder (not indicated in FIG. 1). The devices are interconnected via suitable electronic interfaces.

Information which can be read by such scanner includes information from a reflective or transparent document, a photograph, a film sheet, a map, a table, a character, a symbol and the like. In addition, pattern recognition of a flat object is also included. These info-carriers are further called source documents.

In general, a scanning device of the above-named kind essentially comprises a platen for carrying an image to be scanned, a light-source for illuminating said image, means for directing image-wise modulated light onto an opto-electronic sensor, such as a CCD sensor, and signal digitising means.

Specifically, document scanners are known which comprise a bodily stationary document supporting plate and a scanning unit which is mounted for bodily movement parallel with the plate. In use, a light image of a line across the document is focused within the unit into the optical sensing means so that the document is scanned line by line during a scanning displacement of the unit.

Document scanners are also known which differ from those just referred to in that the scanning unit is fixed and the document supporting plate is mounted for movement relative to said unit.

Also known are feedthrough scanners in which the source document passes a scanning station under well-defined circumstances (as to optical path, moving velocity, etc).

FIG. 2 shows a colour scanner comprising a light source 1 for projecting scanning light towards an image plane and a work support 2 for supporting an image-bearing sheet 3 in said image plane. Said light source 1 and said support 2 are relatively displaced by means of a suitable drive mechanism that is not shown in this figure. A filterwheel 4 is provided for separating white light emitted by the light source 1 into colour components and transmission fibres 5 are provided for directing scanner radiation to the image plane. The scanner further comprises suitable optics (11 to 15) for directing image-wise modulated light to an opto-electronic sensor 16, for example a CCD sensor, and means for converting the image-wise radiation into a digitised signal (not shown on the figure).

Sometimes, it is desirable to transmit documents in which the message and the background do not contrast sharply. For example, a document may be printed in blue ink on a light green background.

In order to accurately and reliably reproduce shades of grey that may be present in such original, at least a minimal distance between the variable input signal and a reference level must be established.

In the present invention, we provide a method for processing a variable data-signal representative of the density of a source document, that has been scanned by a lightbeam and the reflected or transmitted light of which has been collected by at least one or preferably a series of CCD sensorelements.

Said method, commonly called calibration procedure, consists of several steps, executed prior to substantially every document scan, and will be explained consecutively in the following paragraphs (with reference to FIGS. 3, 4 and 5).

In order to define the range within which the source signal operates, first there must be established a white level reference for the maximum whiteness which has to be managed by the scanning apparatus. So, in a first step S1 (see FIG. 4 and FIG. 5), we define a minimal reference density value Vmin (see also FIG. 3), representative of the whitest or lowest possible density value which could possibly occur in the actual source document to be scanned.

In a second step, indicated as S2 in FIG. 4 and 5, the apparatus scans the calibration signal at high density-level, equivalent to the minimum reflection by the black area of a calibration strip. After reading a sample $V_{b1}$ of said calibration signal when said density-value is at its highest level, this value is stored as an offset-value in a calibration memory. More specifically, this offset-value is the lowest level of illumination that a sensor cell could experience during a document scan and by the present method, while calibrating, all possible variations in the dark-current are corrected.

In a third step S3, the apparatus scans the low density-level Vw of the calibration signal in order to correct for variations in the shading, by scanning the white part of the strip.

In a fourth step S4, the amplifier is adapted to the point at which its max output is just equal to the reference level $V_{min}$, as may be controlled by an usual electronic comparator. After dividing $(V_{min}-V_{b1})$ by $(V_w-V_{b1})$ the calculated quotient is permanently stored as a gainfactor G in a calibration memory. Thus:

$$G = \frac{V_{min} - V_{b1}}{V_w - V_{b1}}$$

At this point, the apparatus is ready to start the ultimate scanning process by determination of the signal strength of the variable input signal $V_{in}$ compared to the reflectance level of the reference.

In this way, the apparatus will process the variable input signals $V_{in}$ as exact representatives $V_{corr}$ of the reflective gradations in shades of grey in the original, even if the lowest value of the source signal eventually could reach extremely low values, e.g. on or below the highest calibration level as with $V_{min} \leq V_{in} \leq V_w$.

This means that actually a document having a zone with a whitest density lower or whiter than the usual white density of the conventional calibration strip can be accurately scanned, whereas in the prior art all densities lying between $V_w$ and $V_{min}$ would be compressed. Thus loss of pictorial information, definitely not allowable in electronic high quality graphic or medical scanners, does not occur in the present invention!

FIGS. 4 and 5 recapitulate the present calibration method, respectively in a principal blockdiagram and in a flowchart. It may be remarked that the automatic offset and gain control is applied in a dynamic manner at the beginning of each and every document scan. A calibration operation is thus performed, prior to reading a document, by determining offset and gain for each of the pixel-related amplifiers on the basis of reference signals, most generated by reading a black and white reference plate, commonly called calibration strip. The determined offset and gains are stored in a suitable calibration memory.

Thus permanently stored are two calibration values, namely $$\text{offset} = v_{b1}$$
and
gain $$G = \frac{V_{min} - V_{b1}}{V_w - V_{b1}}$$

The intrinsic scanning consists of reading the signal values $V_{in}$ by scanning the source document, immediately correcting for offset by subtracting $(V_{in} - V_{b1})$ and continually adjusting the offset-corrected input value by multiplying with the precalculated gainfactor G available from the calibration memory, and as a result, the resulting image signal will not be influenced by variations in the optical system. The gainfactor adjustment can be represented as follows:

$$V_{corr} = (V_{in} - V_{b1}) \cdot G$$

FIG. 6 is a principal scheme of a preferred embodiment of the present invention. Some (e.g. gating) circuit is not shown in this figure for purposes of simplicity.

Herein, sensor area 1, without limitation thereto, is a linear CCD having a line of multiple, e.g. 5000 photoelectric conversion elements, which can distinguish 400 pixels per inch on the document, by which the optical input is converted into an electric signal, in this text referred to as "source signal".

For each of the CCD-line sensors 1 an amplifier 3 with an adjustable offset and gain 2 is provided. This illustrates another advantage of the present invention, namely the inherent compensation of sensitivity nonuniformity that exists between the individual cells of the sensor array. After calibration according to the present invention, the results of which are stored for future retrieval in a so-called calibration memory 6, the effective document scanning begins and original exposure is started. The analog electrical signal content of the sensor array is periodically read out, pixel by pixel and row by row.

The outputs from the CCD's 1 are corrected by the obtained offset and gains (ref 2 in FIG. 6), with the positive result that the signal 4 at the output of the amplifier 3 varies exactly in correspondence with the variations in reflectance of the scanned original. For example, zero voltage or a minimum voltage might correspond to a white portion; a maximum voltage would correspond to a black area and intermediate volt to various shades of grey (see also FIG. 3).

FIG. 7 gives an alternative preferred embodiment of the present invention. Herein, part of the analog circuit has been replaced by means for causing the output of the sensor 1 to be converted into a digital signal through an A/D converter 5, thereafter calibrating an amplifier 3 with adjustable offset and gain and causing this digitised calibration signal to stored in a digital memory 6 such as e.g. a random access memory or RAM. As the document pixels are read, the analog signal received from each pixel-element 1 is applied to the input of an analog to digital (A/D) convertor 5. The thus generated conversion for each original pixel may be a multi-bit digital signal, which allows the sensing of different levels of blackness within each pixel.

Several other embodiments of the present invention may be developed without departing from the essential characteristics thereof. Such variations do not deviate essentially from the spirit and the scope of the present invention, In view of the technological progress and the higher stability of modern electronics, one might replace the reference or calibration strip by predetermined values built in the scanner during its manufacture. Whether minimum and maximum density are established by a black and white physical target or by a black and white software programmed reference, makes no conceptual difference.

As to the type of scanner-apparatus, the present invention is largely universal, e.g. it may be applied successfully to scanners with moving platen for carrying the source original, to scanners with stationary platen but moving optics, as well as to feedthrough scanners.

Although the previously mentioned embodiment of the present invention has been described with reference to reflection source originals, the same concept may be adapted for transparent source documents, by defining $V_{min}$ through the lightest "most transparent" zone which could possibly occur in the source document to be scanned.

In addition, the present invention may also be applied for scanning of so-called "inverse-setted or mirrored" source originals, having light characters on a dark paper or carrier-background.

Furthermore, in the case of a colour scanner, the method according to the present invention, may be adapted for colour selection. During the respective preliminary scans, the same said calibration strip is then scanned consecutively through means of colour-typical filters with suitable characteristics concerning spectral transmission and absorption.

As known to the people skilled in the art, other image processing techniques might be applied on the output signal, such as e.g. dithering, unsharp masking etc.

Although the invention as described above relates to a method for correcting unwanted offset and/or gain variations suitable for being used in a graphical scanning system, it may also be employed in document management application or in a scanning system suitable for use in medical or industrial, e.g. non-destructive testing, diagnostic applications.

Recent developments in the imaging art include computerised diagnostics, memorising on stimulable phosphor plates, reproducing hardcopy by means of thermal sublimation or resistive ribbon, and so on. In these applications the wording "density of a source document" has to be interpreted as "light reflected by or transmitted through a source original" and still remains under the same scope and protection of the present invention.

I claim:

1. A method for correcting an original image carried on a source document which comprises the following steps:
   a) Scanning the source document with a light beam;
   b) Collecting the light reflected or transmitted from the source document in an optoelectronic sensor element which converts the collected light into an electrical output signal comprising a sequence of signal values corresponding to said original image;
   c) Converting the output signal values into a sequence of digitized signal values $V_{in}$;
   d) Correcting the signal values $V_{in}$ by the steps comprising:
      i) Defining a minimum value $V_{min}$ representative of the lowest possible density value which could possibly occur in the document to be scanned,
      ii) Identifying from said digitized signal values by comparison with a calibration reference having a high level density and a low level density, a first sample signal value $V_{bi}$ corresponding to the high level density of said reference and storing in a calibration memory the value thus identified as an offset, wherein said offset = $V_{bi}$,
      iii) Identifying from said digitized signal values by comparison with said calibration reference a second sample signal value $V_w$ corresponding to the low level density of said reference,
      iv) calculating a gain factor G according to the equation $$G = \frac{V_{min} - V_{bi}}{V_W - V_{bi}}$$

and permanently storing said gain factor G in said calibration memory
      v) Correcting the digitized signal values $V_{in}$ by a) first, immediately compensating for offset by calculating the difference in signal values $V_{dif}$ between $V_{bi}$ and $V_{in}$ ($V_{dif}=V_{in}-V_{bi}$) and b) second, continually adjusting $V_{dif}$ for gain by multiplying the same by said gain factor G to yield a corrected signal values $V_{corr}$ ($V_{corr}=V_{dif}G$); and
   e) Applying the corrected signal values $V_{corr}$ to a scanning unit to reproduce a corrected image of said original image.

2. A method according to claim 1 wherein said calibration reference is a calibration strip consisting of a predetermined black area and a predetermined white area.

3. A method according to claim 2 wherein said black and white areas are established on the face of a calibration strip which is positioned outside the area of the document being scanned.

4. A method according to claim 1 wherein said calibration reference is a set of preprogrammed calibration values.

5. A method according to claim 1, characterised in that the sensor element is a CCD-element.

* * * * *